US012640899B2

(12) United States Patent
Wilhelmsson et al.

(10) Patent No.: US 12,640,899 B2
(45) Date of Patent: May 26, 2026

(54) OPTIMIZING INTERFRAME SPACE IN TDD

(71) Applicant: Telefonaktiebolaget LM Ericsson (publ), Stockholm (SE)

(72) Inventors: Leif Wilhelmsson, Lund (SE); Per Skillermark, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 280 days.

(21) Appl. No.: 18/547,169

(22) PCT Filed: Feb. 25, 2022

(86) PCT No.: PCT/EP2022/054784
§ 371 (c)(1),
(2) Date: Aug. 21, 2023

(87) PCT Pub. No.: WO2022/184573
PCT Pub. Date: Sep. 9, 2022

(65) Prior Publication Data
US 2024/0056282 A1 Feb. 15, 2024

Related U.S. Application Data

(60) Provisional application No. 63/155,399, filed on Mar. 2, 2021.

(51) Int. Cl.
*H04L 5/14* (2006.01)

(52) U.S. Cl.
CPC .................................. *H04L 5/1469* (2013.01)

(58) Field of Classification Search
None
See application file for complete search history.

(56) References Cited

U.S. PATENT DOCUMENTS

| | | | |
|---|---|---|---|
| 2006/0159053 A1* | 7/2006 | Donovan | H04W 52/0216 370/338 |
| 2007/0165556 A1* | 7/2007 | Donovan | H04W 52/0229 370/318 |
| 2013/0051318 A1* | 2/2013 | Matsuo | H04B 15/02 370/328 |
| 2015/0138999 A1 | 5/2015 | Avudainayagam et al. | |
| 2016/0335147 A1 | 11/2016 | Asterjadhi | |
| 2022/0385433 A1* | 12/2022 | Rantala | H04J 13/0062 |

* cited by examiner

*Primary Examiner* — Anh Vu H Ly
(74) *Attorney, Agent, or Firm* — Murphy, Bilak & Homiller, PLLC

(57) ABSTRACT

Embodiments described herein relate to methods and apparatuses for optimizing interframe space in time division duplexing communication between a first wireless device and a second wireless device. A method in the first wireless device comprises receiving a first packet from the second wireless device; selecting an interframe space, IFS, duration from a plurality of possible IFS durations; and transmitting a second packet to the second wireless device when the selected IFS duration has elapsed after receipt of the first packet.

19 Claims, 5 Drawing Sheets

Master

Slave

SIFS

LIFS

SIFS

201 Receive a first packet from the second wireless device

202 Select an interframe space, IFS, duration from a plurality of possible IFS durations 203 Transmit a second packet to the second wireless device when the selected IFS duration has elapsed after receipt of the first packet.

OPTIMIZING INTERFRAME SPACE IN TDD

TECHNICAL FIELD

Embodiments described herein relate to methods and apparatuses for selecting an interframe space duration for use in time division duplexing.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Wireless systems may be categorized as frequency division duplex (FDD) or time division duplex (TDD). In the former case, different frequency resources may be used for the different direction communication between two wireless devices. For instance, a cellular system based on FDD may use one frequency channel for the uplink communication and another frequency channel for the downlink (DL) communication. FDD has some advantages over TDD, but one disadvantage is that two frequency channels are required. In contrast, when TDD is used, the same frequency channel may be used for both directions. So, in case of a cellular system, the DL and the UL may use the same frequency channel.

When TDD is used, a guard time is needed between the DL and UL. How large the guard time needs to be may depend on various things, for example, the guard time may be based on the time it takes for a wireless device to switch from transmission to reception or vice versa. When this is the case, the guard time is often referred to as the interframe space (IFS).

In IEEE 802.11, a number of IFSs are defined. The shortest IFS, referred to as short IFS (SIFS) is 16 µs in duration. The SIFS is used between a packet and the corresponding ACK.

In Bluetooth Low Energy, the IFS is 150 µs, i.e., significantly larger than what is used in IEEE 802.11. The reason why Bluetooth Low Energy is using a larger IFS is because Bluetooth Low Energy uses frequency hopping (FH), i.e., the frequency channel used for communication is sometimes changed, and when frequency hopping occurs a certain time period may be needed in order for the frequency synthesizer to settle at the new frequency.

It will be appreciated that it is general desirable to keep the IFS as small as possible since no data is transmitted during this time, thus the IFS can be viewed as overhead.

SUMMARY

According to some embodiments there is provided a method in a first wireless device, wherein the first wireless device is communicating with a second wireless device using time division duplexing. The method comprises receiving a first packet from the second wireless device; selecting an interframe space, IFS, duration from a plurality of possible IFS durations; and transmitting a second packet to the second wireless device when the selected IFS duration has elapsed after receipt of the first packet.

According to some embodiments there is provided a first wireless device, wherein the first wireless device is communicating with a second wireless device using time division duplexing. The first wireless device comprises processing circuitry configured to receive a first packet from the second wireless device; select an interframe space, IFS, duration from a plurality of possible IFS durations; and transmit a second packet to the second wireless device when the selected IFS duration has elapsed after receipt of the first packet.

Embodiments enable selection of a shorter interframe space, IFS, duration under certain circumstances. Thereby, the time for a complete packet exchange may be reduced.

BRIEF DESCRIPTION OF THE DRAWINGS

For a better understanding of the embodiments of the present disclosure, and to show how it may be put into effect, reference will now be made, by way of example only, to the accompanying drawings, in which.

DETAILED DESCRIPTION

Figure 1:
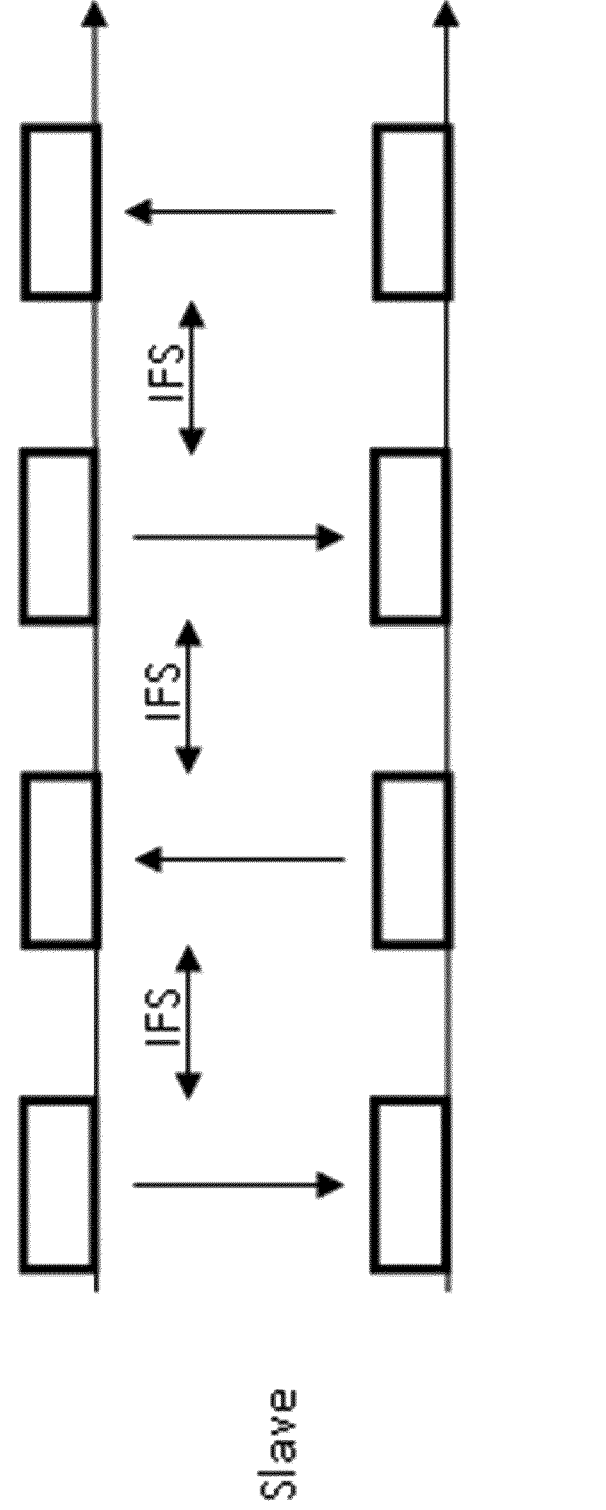
FIG. 1 illustrates a Bluetooth Low Energy connection with an interframe space (IFS) between packets.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

As mentioned above, it may be desirable to keep the Interframe Space (IFS) as small as possible in order to reduce the overhead. At the same time, there are practical limitations, in particular for systems based on frequency hopping (FH), for how short the IFS can be. This means that a FH system may be inefficient in supporting communication of short packets, where the IFS is relatively large compared to the packet duration.

Embodiments described herein provide methods and apparatuses in which the IFS may be adapted based on various circumstances. In particular, for a system employing FH, the IFS may be adapted based on whether the frequency is changed from one packet to the next or if the same frequency is used. Since a standard may need to clearly specify whether a frequency change should take place or not, all units involved in the communication may be configured to associate which IFS to use with whether the frequency changes or not, so this approach does not impose any addition complexity e.g. in terms of signaling. When the standard defines that a frequency change is to take place, both the transmitter and the receiver therefore know this and will use a larger IFS in order to allow for the frequency synthesizer to be sufficiently stable at the new frequency, whereas if the standard defines that the same frequency shall be used for the next packet, both the transmitter and the receiver know this and will thus use a smaller IFS.

For example, in Bluetooth Low energy communication, communication between wireless devices can take place in non-connected states and connected state. In the connected state, a connection has been established between two Bluetooth Low Energy devices, referred to as the master (or central) device and the slave (or peripheral) device, respectively. In a Bluetooth Low Energy connection, communication occurs in connection events, and the time between two connection events is called the connection interval. In a connection event, the master and the slave devices alternate sending and receiving packets, all on the same frequency. When changing from one connection event to another, the frequency used for the communication is also changed. The frequency to use in a connection event is determined by a pseudo-random algorithm, known to both the master and slave devices. Hence, to summarize, frequency hopping is applied between connection events while the same frequency is used within each connection event.

In a Bluetooth Low Energy connection (and in Bluetooth Low Energy in general), there is an interframe space (IFS) between packets as illustrated in FIG. 1. In some cases, the connection event may correspond to a single transmission from the Master to the Slave with corresponding ACK/NACK, whereas in other situations the connection event may contain a relatively large number of packet exchanges before the frequency channel is changed.

The IFS used in Bluetooth Low Energy may for example be 150 μs, and since many packets are relatively short this is length of IFS results in a relatively large overhead and reduces the efficiency of the system.

The IFS is needed for the radio to turn from transmission to reception, or vice versa. The IFS also often needed for the baseband processing at the receiver due to that the contents of the packet to be transmitted next may depend on whether the reception was successful or not. As an example, referring to FIG. 1, if the Master sends a data packet to the Slave, the packet sent from the Slave to the Master will contain and ACK/NACK to indicate whether the packet was correctly received. Thus, there must be sufficient time for the Slave to process the packet to determine whether the packet is correct, and then, based on the result, encode and format the packet carrying the ACK/NACK information. As another example, when the Master receives the response from the Slave, it must process the packet to determine whether the previously transmitted packet was correctly received or not. In case the packet was not correctly received, i.e., a NACK was received, the Master will typically retransmit the packet. On the other hand, if an ACK is received indicating that the packet was correctly received, a new packet is typically transmitted.

For the radio, the length of time actually required in the IFS may differ greatly depending on whether the next packet will be transmitted/received on the same frequency channel or if a change of frequency channel has to made. Just switching from TX to RX, or vice versa, on the same frequency channel may take in the order of 10 μs, and this may in fact be less than the time required for performing the baseband processing described above. However, when there is a change of frequency channel, the frequency synthesizer is re-tuned and this may take on the order of 150 μs.

There is a trade-off regarding how fast the change of frequency can be made and how stable the frequency will be. In other words, it is possible to speed up the time for making a frequency change at the expense of a less stable frequency. Since there are practical limits regarding the stability of the frequency when high performance reception is desired, i.e., coherent reception of the data, there is a practical limitation regarding how small IFS can be when a change of frequency channel is to be made.

Figure 2:
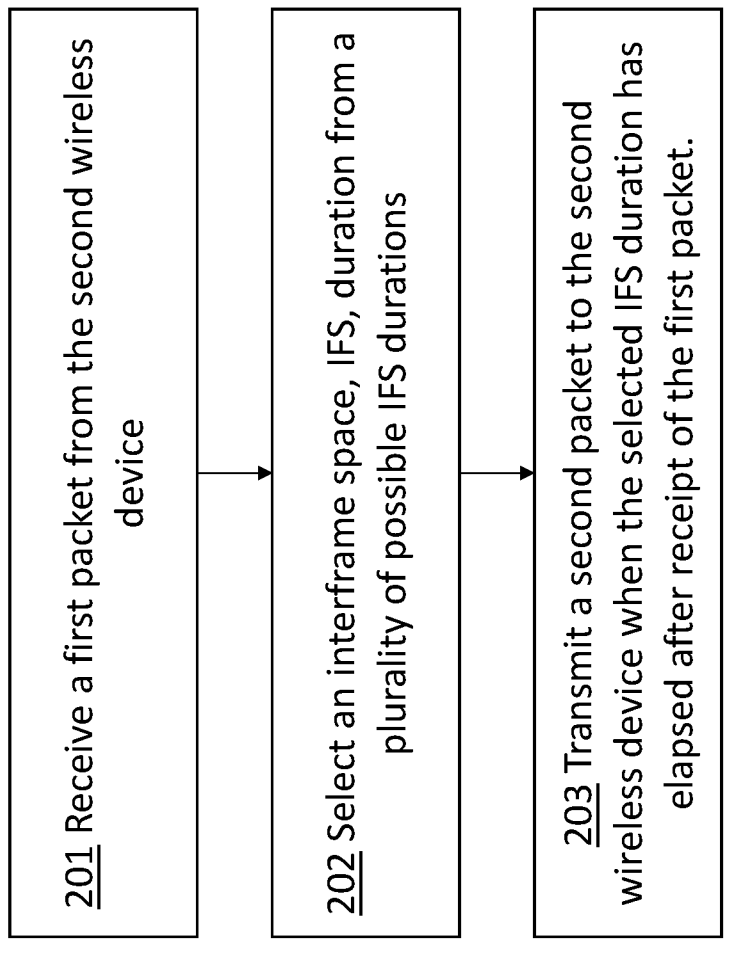
FIG. 2 illustrates a method in a first wireless device, wherein the first wireless device is communication with a second wireless device using time division duplexing.

FIG. 2 illustrates a method in a first wireless device, wherein the first wireless device is in communication with a second wireless device using time division duplexing. The first wireless device and second wireless device may be communicating using any suitable wireless technology, for example, a Bluetooth Low Energy connection. It will be appreciated that the first wireless device may act as either a master or a slave in the communication. Similarly, the second wireless device may act as either a master or a slave in the communication.

In step 201, the first wireless device receives a first packet from the second wireless device.

In step 202, the first wireless device selects an interframe space, IFS, duration from a plurality of possible IFS durations.

For example, step 202 may comprise selecting an IFS based on whether a first frequency channel used for transmission of the first packet is the same or different from a second frequency channel used for transmission of the second packet. For example, when the first frequency channel and the second frequency channel are the same, the selected IFS duration may be shorter than when the first frequency channel and the second frequency channel are different.

Figure 3:
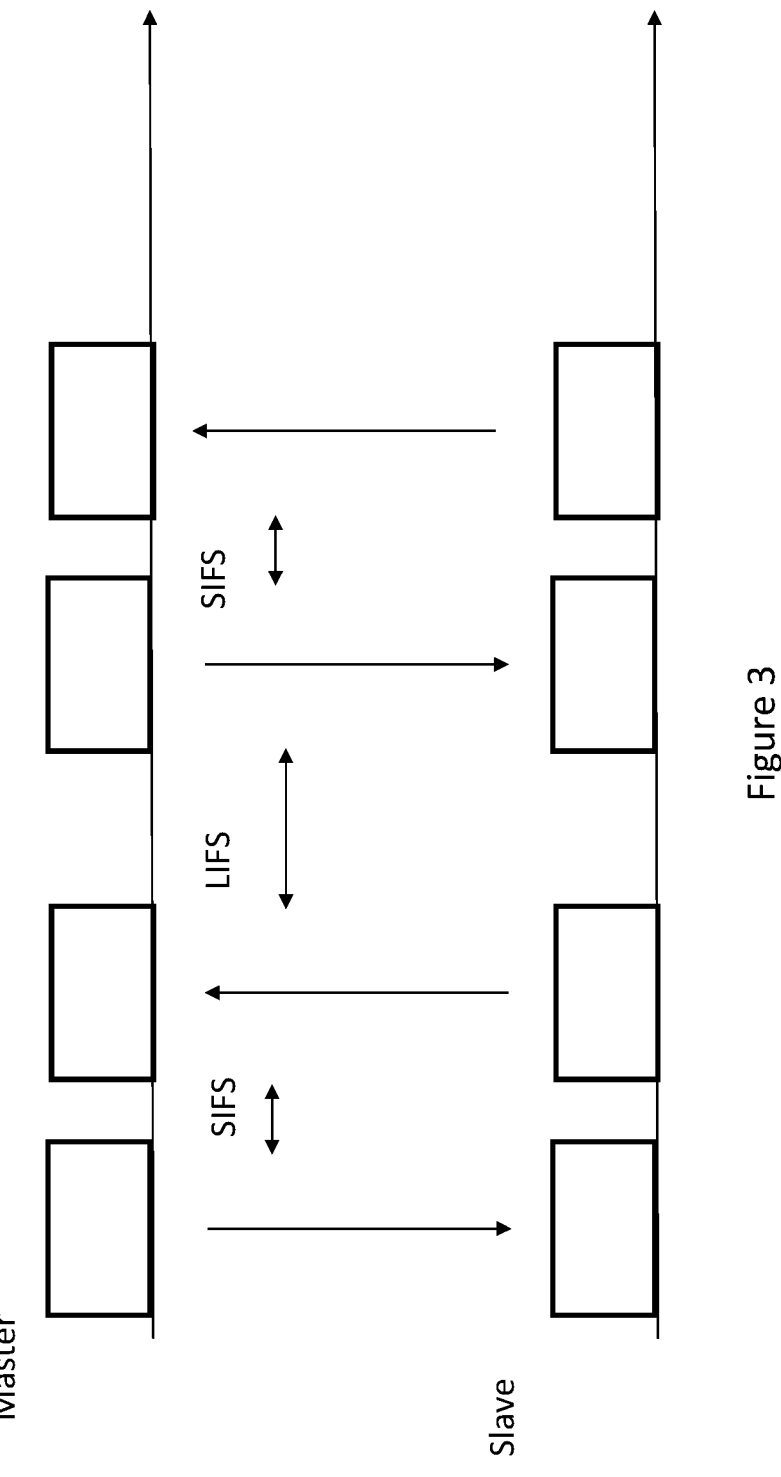
FIG. 3 illustrates an example where a Bluetooth Low Energy connection event comprises a packet and its corresponding ACK/NACK.

FIG. 3 illustrates an example where a Bluetooth Low Energy connection event comprises a packet and its corresponding ACK/NACK. In this example, a shorter IFS (SIFS) is thus used between a packet and the corresponding ACK/NACK, whereas a longer IFS (LIFS) is used when there is a change of frequency. In this particular example, every other IFS would be SIFS and every other IFS would be LIFS. As an example, if the average packet duration is 200 μs, a SIFS may be 10 μs and a LIFS may be 150 μs, the time for a complete packet exchange may therefore be reduced from 200+150+200+150=700 µs to 200+10+200+150=560 µs, a reduction of 20%.

Figure 4:
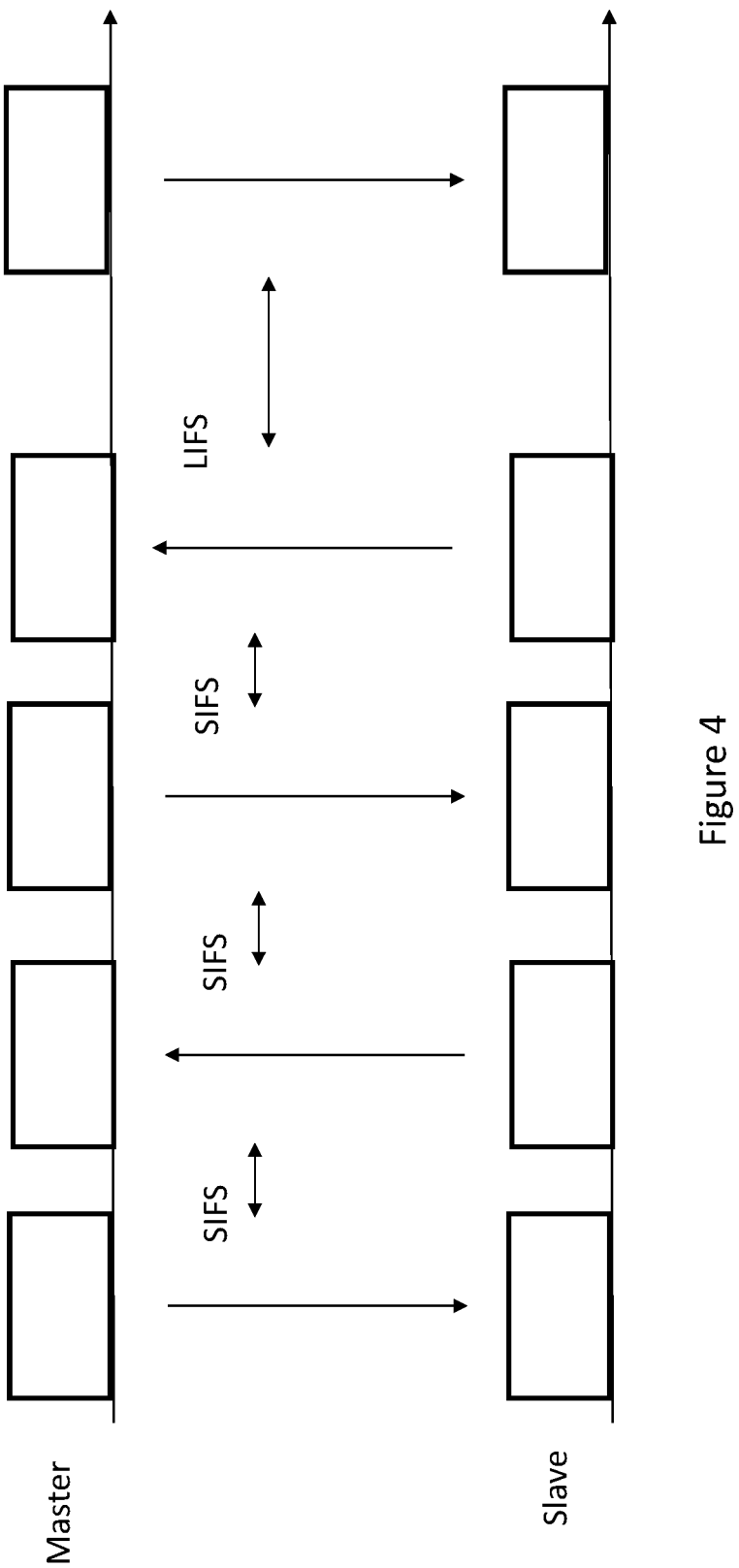
FIG. 4 illustrates an example in which several packets are exchanged on the same frequency before making a change of frequency channel.

In other examples, several packets may be exchanged on the same frequency before making a change of frequency channel, for example, as illustrated in FIG. 4. In this case the gain in efficiency is even higher. Continuing the numerical example above, if the number of packets on the same frequency is large, then asymptotically, the reduction in time for a completed packet exchange for the example of 200 µs long packets would be 40%. Naturally, for longer packets the overhead due to the IFS will decrease.

As noted above, the requirement concerning IFS may differ and it may be desirable to try to select as small an IFS as possible, even if the frequency is not perfectly settled when a change in frequency change is made. However, where different IFSs are used as described above, it may, in some cases, be advantageous to select a longer IFS (LIFS) than would previously have been used for IFSs in which the frequency changes. In this example the LIFS would be greater than the standard IFS and the SIFS would be less than the standard IFS.

In some examples, step 202 comprises selecting an IFS duration based on whether a modulation used for the second packet is intended for non-coherent reception. For example, when the modulation used for the second packet is intended for non-coherent reception, a shorter IFS duration may be selected than when the modulation used for the second packet is intended for coherent reception.

In other words, when the modulation used for a packet is intended for non-coherent reception (e.g. differential detection at the receiver), the stability of the frequency is less of a concern and it may be possible to use a relatively short IFS. On the other hand, for high performance links where relatively high spectrum efficiency is targeted, coherent reception may be required. In this case may be desirable for the frequency to be stable, and a larger IFS may be selected. Thus, according to this embodiment, different IFSs are used depending on the modulation used in the packets.

For example, a system may utilise more than one modulation and coding scheme (MCS), where some of the MCSs are more robust and can be decoded without coherent reception, whereas another MCS is less robust and requires coherent reception.

In some examples, a system may support two modes, where one mode is more robust and can use a shorter IFS, whereas the other mode uses a higher data rate and may therefore need a larger IFS.

In some embodiments step 202 comprises selecting an IFS duration based on a time required to decode the first packet. For example, the time required to decode the first packet may depend on a complexity of coding used to encode the first packet and a length of the first packet. For example, if a more powerful coding is used with e.g. iterative decoding, the decoding delay may be larger than if a simpler code is used.

For example, when the time required to decode the first packet is shorter, a shorter IFS duration is selected than when the time required to decode the first packet is longer.

In some embodiments, step 202 comprises selecting an IFS duration based on how much time is needed for the first wireless device to switch between transmission mode and reception mode or reception mode and transmission mode.

In step 203, the method then comprises transmitting a second packet to the second wireless device when the selected IFS duration has elapsed after receipt of the first packet.

It will be appreciated that in some embodiments the aforementioned examples of how step 202 may be performed may be combined. For example, a first IFS may be selected when no frequency change occurs between packets, a second IFS which is longer than the first IFS may be selected when a frequency change does occur but the modulation of the first packet is robust, and a third IFS which is longer than the second IFS may be selected when frequency change does occur and the modulation of the first packet requires coherent reception.

In some embodiments, (e.g. those utilising Bluetooth Low Energy), the method may further comprise selecting a duration of a connection event for a Bluetooth Low Energy connection between the first wireless device and the second wireless device based on: a first IFS duration that would be selected when the first packet and the second packet are transmitted the same frequency channel; and a second IFS duration that would be selected when the first packet and the second packet are transmitted using different frequency channels.

The selection of a suitable connection interval (or duration of a connection event) for a Bluetooth Low Energy connection can depend on various factors, such as the application requirements in terms of throughput and latency, duty cycle (and hence power consumption), and in-device coexistence requirements. In some embodiments, the selection of a connection interval is made as a function of the length of the first and second IFSs (in addition to other factors already exemplified), and the impact this has on the efficiency and throughput of the connection.

For example, when a relatively short first IFS is used between packets using the same frequency (within a connection event) and a relatively long second IFS is used between packets on different frequencies (between connection events), a higher efficiency is achieved when the connection event is relatively long. Therefore, in some embodiments a longer connection event may be selected when the difference between the first IFS duration and the second IFS duration is greater.

Figure 5:
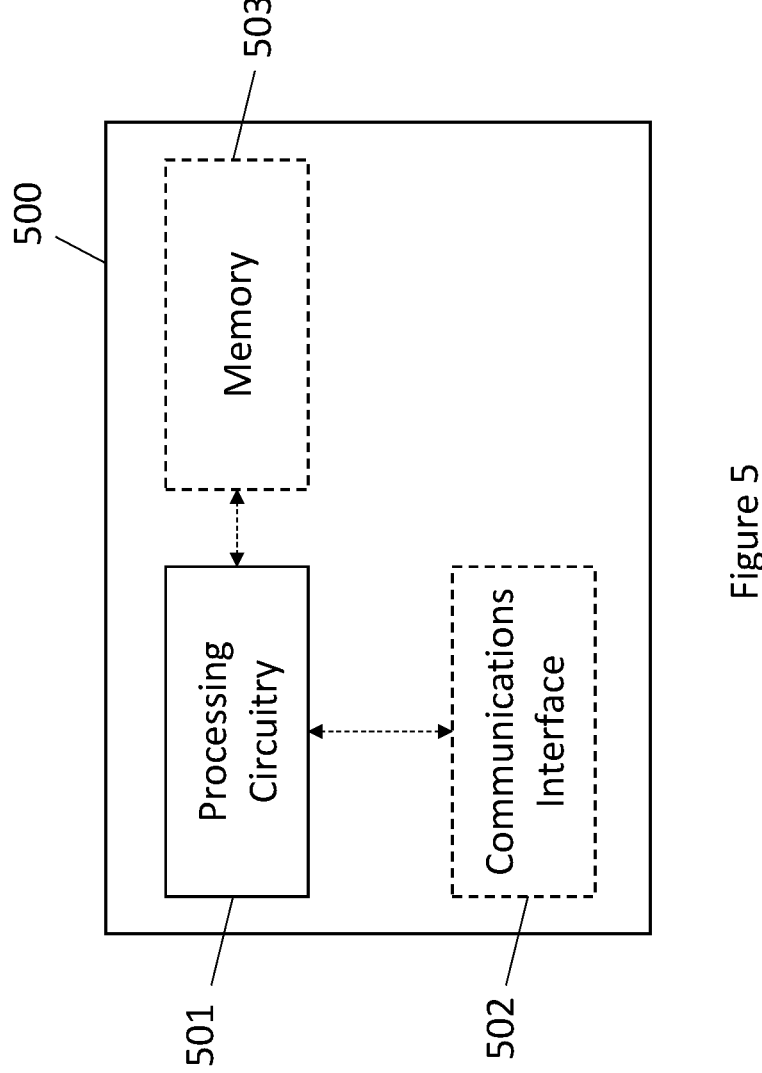
FIG. 5 illustrates a first wireless device comprising processing circuitry (or logic).

FIG. 5 illustrates a first wireless device 500 comprising processing circuitry (or logic) 501. The processing circuitry 501 controls the operation of the first wireless device 500 and can implement the method described herein in relation to a first wireless device 500. The processing circuitry 501 can comprise one or more processors, processing units, multi-core processors or modules that are configured or programmed to control the first wireless device 500 in the manner described herein. In particular implementations, the processing circuitry 501 can comprise a plurality of software and/or hardware modules that are each configured to perform, or are for performing, individual or multiple steps of the method described herein in relation to the first wireless device 500.

The first wireless device is communicating with a second wireless device using time division duplexing. Briefly, the processing circuitry 501 of the first wireless device 500 is configured to: receive a first packet from the second wireless device, select an interframe space, IFS, duration from a plurality of possible IFS durations; and transmit a second packet to the second wireless device when the selected IFS duration has elapsed after receipt of the first packet.

In some embodiments, the first wireless device 500 may optionally comprise a communications interface 502. The communications interface 502 of the first wireless device 500 can be for use in communicating with other nodes, such as other virtual nodes. For example, the communications interface 502 of the first wireless device 500 can be configured to transmit to and/or receive from other nodes requests, resources, information, data, signals, or similar. The processing circuitry 501 of first wireless device 500 may be configured to control the communications interface 502 of the first wireless device 500 to transmit to and/or receive from other nodes requests, resources, information, data, signals, or similar.

Optionally, the first wireless device 500 may comprise a memory 503. In some embodiments, the memory 503 of the first wireless device 500 can be configured to store program code that can be executed by the processing circuitry 501 of the first wireless device 500 to perform the method described herein in relation to the first wireless device 500. Alternatively or in addition, the memory 503 of the first wireless device 500, can be configured to store any requests, resources, information, data, signals, or similar that are described herein. The processing circuitry 501 of the first wireless device 500 may be configured to control the memory 503 of the first wireless device 500 to store any requests, resources, information, data, signals, or similar that are described herein.

Embodiments described herein allow for a simple means to increase the efficiency of a time division duplexing system, e.g. when the system is using frequency hopping. Embodiments described herein also allow for potentially increasing the duration of an IFS in a situation where it is critical that the transmitter's frequency is stable to allow for reliable synchronization at challenging channel conditions.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a first wireless device, wherein the first wireless device is communicating with a second wireless device using time division duplexing, the method comprising:
   receiving a first packet from the second wireless device;
   selecting an interframe space (IFS) duration from a plurality of possible IFS durations; and
   transmitting a second packet to the second wireless device when the selected IFS duration has elapsed after receipt of the first packet;
   wherein the step of selecting an IFS duration is based on whether a first frequency channel used for transmission of the first packet is the same or different from a second frequency channel used for transmission of the second packet.

2. The method of claim 1, wherein when the first frequency channel and the second frequency channel are the same, the selected IFS duration is shorter than when the first frequency channel and the second frequency channel are different.

3. The method of claim 1, further comprising:
   selecting a duration of a connection event for a Bluetooth Low Energy connection between the first wireless device and the second wireless device based on: a first IFS duration that would be selected when the first packet and the second packet are transmitted on the same frequency channel; and a second IFS duration that would be selected when the first packet and the second packet are transmitted using different frequency channels.

4. The method of claim 1, wherein the step of selecting an IFS duration is based further on whether a modulation used for the second packet is intended for non-coherent reception.

5. The method of claim 4, wherein, when the modulation used for the second packet is intended for non-coherent reception, a shorter IFS duration is selected than when the modulation used for the second packet is intended for coherent reception.

6. The method of claim 1, wherein the step of selecting an IFS duration is based further on a time required to decode the first packet.

7. The method of claim 6, wherein the time required to decode the first packet depends on a complexity of coding used to encode the first packet and a length of the first packet.

8. The method of claim 6, wherein, when the time required to decode the first packet is shorter, a shorter IFS duration is selected than when the time required to decode the first packet is longer.

9. The method of claim 1, wherein the step of selecting an IFS duration is based further on how much time is needed for the first wireless device to switch between transmission mode and reception mode or reception mode and transmission mode.

10. A first wireless device configured to communicate with a second wireless device using time division duplexing, the first wireless device comprising:
   radio communications circuitry; and
   processing circuitry configured to:
   receive, via the radio communications circuitry, a first packet from the second wireless device;
   select an interframe space (IFS) duration from a plurality of possible IFS durations; and
   transmit, via the radio communications circuitry, a second packet to the second wireless device when the selected IFS duration has elapsed after receipt of the first packet;
   wherein the processing circuitry is configured to perform the step of selecting an IFS duration is based on whether a first frequency channel used for transmission of the first packet is the same or different from a second frequency channel used for transmission of the second packet.

11. The first wireless device of claim 10, wherein when the first frequency channel and the second frequency channel are the same, the selected IFS duration is shorter than when the first frequency channel and the second frequency channel are different.

12. The first wireless device of claim 10, wherein the processing circuitry is configured to:
   select a duration of a connection event for a Bluetooth Low Energy connection between the first wireless device and the second wireless device based on: a first IFS duration that would be selected when the first packet and the second packet are transmitted the same frequency channel; and a second IFS duration that would be selected when the first packet and the second packet are transmitted using different frequency channels.

13. The first wireless device of claim 10, wherein the processing circuitry is configured to perform the step of selecting an IFS duration based further on whether a modulation used for the second packet is intended for non-coherent reception.

14. The first wireless device of claim 13, wherein, when the modulation used for the second packet is intended for non-coherent reception, a shorter IFS duration is selected than when the modulation used for the second packet is intended for coherent reception.

15. The first wireless device of claim 10, wherein the processing circuitry is configured to perform the step of selecting an IFS duration based further on a time required to decode the first packet.

16. The first wireless device as in claim 15, wherein the time required to decode the first packet depends on a complexity of coding used to encode the first packet and a length of the first packet.

17. The first wireless device of claim 15, wherein, when the time required to decode the first packet is shorter, a shorter IFS duration is selected than when the time required to decode the first packet is longer.

18. The first wireless device of claim 10, wherein the step of selecting an IFS duration is based further on how much time is needed for the first wireless device to switch between transmission mode and reception mode or reception mode and transmission mode.

19. A non-transitory computer readable medium storing computer program instructions that, when executed by processing circuitry of a first wireless device that is configured for communicating with a second wireless device via time division duplexing, cause the processing circuitry to:

receive a first packet from the second wireless device;

select an interframe space (IFS) duration from a plurality of possible IFS durations; and transmit a second packet to the second wireless device when the selected IFS duration has elapsed after receipt of the first packet;

wherein the step of selecting an IFS duration is based on whether a first frequency channel used for transmission of the first packet is the same or different from a second frequency channel used for transmission of the second packet.

* * * * *